(12) United States Patent
Unrau

(10) Patent No.: US 12,248,915 B2
(45) Date of Patent: *Mar. 11, 2025

(54) SYSTEM AND METHOD FOR PAYMENT PROCESSING TELEMETRY

(71) Applicant: Worldpay, LLC, Symmes Township, OH (US)

(72) Inventor: Jackson Andrew Unrau, Littleton, CO (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/185,566

(22) Filed: Mar. 17, 2023

(65) Prior Publication Data
US 2023/0222461 A1     Jul. 13, 2023

Related U.S. Application Data

(63) Continuation of application No. 14/522,685, filed on Oct. 24, 2014, now Pat. No. 11,631,065.

(51) Int. Cl.
| | | |
|---|---|---|
| G06Q 20/00 | (2012.01) | |
| G06Q 20/10 | (2012.01) | |
| G06Q 20/38 | (2012.01) | |

(52) U.S. Cl.
CPC ........... *G06Q 20/10* (2013.01); *G06Q 20/386* (2020.05)

(58) Field of Classification Search
CPC .................................................. G06Q 20/386
USPC .......................................................... 705/39
See application file for complete search history.

(56) References Cited

U.S. PATENT DOCUMENTS

| | | | | |
|---|---|---|---|---|
| 5,666,108 A | * | 9/1997 | Duffy | G08C 15/12 |
| | | | | 340/9.1 |
| 2006/0206698 A1 | | 9/2006 | Foucher et al. | |
| 2006/0253392 A1 | * | 11/2006 | Davies | G06Q 20/20 |
| | | | | 705/40 |

(Continued)

FOREIGN PATENT DOCUMENTS

| | | | | |
|---|---|---|---|---|
| WO | WO-0062136 A1 | * | 10/2000 | ............. G05B 15/02 |
| WO | 2010067388 A1 | | 6/2010 | |
| WO | 2016060684 A1 | | 4/2016 | |

OTHER PUBLICATIONS

Authors: Robert Lohse et al; Title: Telemetry Data Reduction for Space Vehicles; IEE Xplore; Date of Publication: Apr. 1964 (Year: 1964).*

(Continued)

*Primary Examiner* — Bruce I Ebersman
*Assistant Examiner* — Hatem M Ali
(74) *Attorney, Agent, or Firm* — Bookoff McAndrews, PLLC

(57) ABSTRACT

A computer-implemented system and method of tracking telemetry data at a financial computing system is presented. The system and method includes receiving an electronic message that includes a payment transaction originating from a payment terminal, and associating a unique transaction identifier to the payment transaction. Telemetry data for the payment transaction is received from payment processing applications through a telemetry interface and aggregated into a data store. The aggregated telemetry data associated with the unique identifier is presented on a user interface by the financial computing system.

17 Claims, 3 Drawing Sheets

(56) References Cited

U.S. PATENT DOCUMENTS

2014/0249994 A1* 9/2014 Proud .................... H02J 50/80
705/39

OTHER PUBLICATIONS

Attila Franko et al; Title: Asset and Production Tracking through Value Chains for Industry 4.0 using the Arrowhead Framework; IEE Xplore; Date of Conference: May 6-9, 2019 (Year: 2019).*
Ran Basat et al: Cost Effective Troubleshooting of NFV Infrastructure: Publisher: IEEE; ISBN information: Date of Conference: Jun. 22-26, 2020:Conf. Location: Paris, France. (Year: 2020).
Shuja-ur-Rehman Baig et al: Real-Time Data Center's Telemetry Reduction and Reconstruction Using Markov Chain Models: IEEE Publication: ISSN (Paper): 1932-8184: Last Update: Dec. 6, 2019 Publication Date: Jun. 10, 2019 (Year: 2019).

* cited by examiner

SYSTEM AND METHOD FOR PAYMENT PROCESSING TELEMETRY

CROSS-REFERENCE TO RELATED APPLICATION(S)

This patent application is a continuation of and claims the benefit of priority to U.S. Nonprovisional patent application Ser. No. 14/522,685, filed on Oct. 24, 2014, the entirety of which is incorporated herein by reference.

TECHNICAL FIELD

The systems and methods described below relate generally to the field of providing telemetry information during financial transaction processing by payment processing applications. More particularly, the systems and methods relate to the field of receiving and displaying telemetry information associated with card payment processing transactions that occur between payment terminals, payment processing applications, and acquirer processors.

SUMMARY

A computer-implemented method of tracking telemetry data, at a financial computing system that includes a plurality of payment processing applications, includes receiving, by the financial computing system, an electronic message that includes a payment transaction and that originates from a payment terminal, and associating a unique transaction identifier to the payment transaction. The method further includes receiving telemetry data for the payment transaction by the financial computing system from each of the payment processing applications through a telemetry interface accessible to the processing applications, and aggregating the telemetry data for the payment transaction into a data store. The method further includes presenting the aggregated telemetry data associated with the unique identifier on a user interface by the financial computing system.

A non-transitory computer readable medium includes instructions stored thereon that when executed by a processor causes the processor to receive an electronic message that includes a payment transaction and associate a unique transaction identifier to the payment transaction. The instructions further cause the processor to receive telemetry data for the payment transaction from a plurality of payment processing applications that perform a respective payment processing function associated with the payment transaction, and aggregate the telemetry data for the payment transaction into a telemetry database. The instructions further cause the processor to cause presentment of the aggregated telemetry data on a user interface.

A payment processing system includes a means for receiving an electronic message originating from a payment terminal that includes a payment transaction, and a means for associating a unique transaction identifier to the payment transaction. The payment processing system includes a means for receiving telemetry data for the payment transaction from a plurality of payment processing applications that perform a respective payment processing function associated with the payment transaction, and a means for aggregating the telemetry data for the payment transaction into a data store. The payment processing system further includes a means for causing presentment of the aggregated telemetry data for the payment transaction on a user interface.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
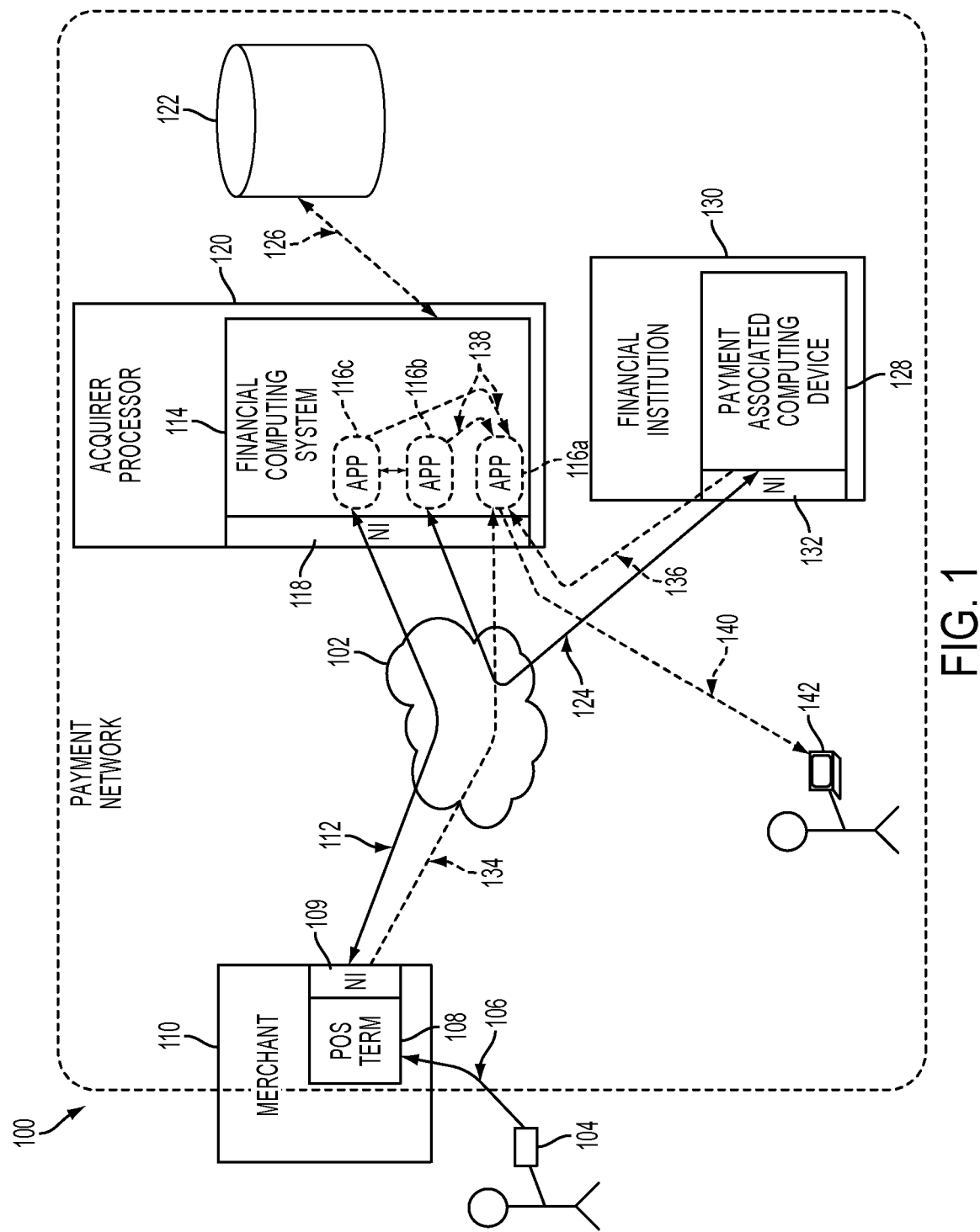
FIG. 1 depicts a block diagram of an example payment network for tracking telemetry data.

Various non-limiting embodiments of the present disclosure will now be described to provide an overall understanding of the principles of the structure, function, and use of systems, apparatuses, devices, and methods disclosed herein for payment processing telemetry. Telemetry information can be received from computing systems associated with the processing of payment vehicle transactions by merchant payment terminals, acquirer processors, and financial institutions. One or more examples of these non-limiting embodiments are illustrated in the selected examples disclosed and described in detail with reference made to FIGS. 1-3 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. Similarly message is to be construed expansively and can include text messages, any suitable communications containing data, the communication of data contracts for example a data contract associated with the .Net Framework of Microsoft, XML-type data, and so forth.

It should be noted that, for clarity and to aid in understanding, some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

For simplicity, the description that follows will be provided by reference to a "payment vehicle," which generally refers to any type of financial alternative to currency. As is to be clear to those skilled in the art, no aspect of the present disclosure is specifically limited to a specific type of payment vehicle. Therefore, it is intended that the following description encompasses the use of the present disclosure with many other forms of financial alternatives to currency, including credit card, debit cards, smart cards, single-use cards, pre-paid cards, electronic currency (such as might be provided through a cellular telephone or personal digital assistant), and the like. Payment vehicles can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A payment vehicle can also have electronic functionality provided by a network of electronic circuitry that is printed or otherwise incorporated onto or within the payment vehicle (and typically referred to as a "smart card"), or be a fob having a transponder and an RFID reader.

FIG. 1 depicts a block diagram of an example payment processing network 100. An example payment processing network 100 can include a payment terminal, for example a point-of-sale terminal 108 of a merchant 110, a financial computing system 114 of an acquirer processor 120, a payment associated computing device 128 of a financial institution 130, and a network 102, among other computing devices. The point-of-sale terminal 108 and the financial computer system 114 can be payment associated computing devices, or include one or more payment associated computing devices as appropriate. In the example payment processing network 100, a payment vehicle user presents a payment vehicle 104 to a merchant 110 for payment 106 of goods or services at a point-of-sale terminal 108 associated with the merchant 110. The merchant 110 can be a brick-and-mortar merchant, an online merchant, or any other type of entity capable of receiving payment from a payment vehicle transaction. In the illustrated embodiment, the payment vehicle 104 is issued by a financial institution 130. The merchant 110 utilizes the acquirer processor 120 to processes payment vehicle transactions, shown as payment transactions 112. An example payment transaction 112 is an authorization request from the point-of-sale terminal 108 for funds from the financial institution 130 that issued the payment vehicle 104. The acquirer processor 120 can be a merchant acquirer or merchant acquirer processor as appropriate.

The point-of-sale terminal 108 can include a network interface 109 that allows the point-of-sale terminal 108 to transmit the payment transaction 112 across the network 102. The payment transaction 112 is received at the network interface 118 of the financial computing system 114 of the acquirer processor 120. The acquirer processor 120 processes the payment transaction 112 for the merchant 110. The acquirer processor 120 can seek authorization 124 for payment transaction 112 originating from the merchant 110 from the financial institution 130. A bank authorization request (BAU request) for a requested amount of funds can be sent to the payment associated computing device 128 of the financial institution 130, for example. The BAU request can be transmitted from the network interface 118 of the financial computing system 114 to the network interface 132 of the payment associated computing device 128 of the financial institution 130. As is to be appreciated, the authorization 112 can be routed through various entities with a payment network 100, and use different network interfaces associated with different computing devices as would be understood in the art. In response, the payment associated computing device 128 of the financial institution 130 can send a bank authorization response (BAU response), for example an approval response, to the financial computing system 114 of the acquirer processor 120 for the amount of the payment transaction 112, and the financial computing system 114 can inform the point-of-sale terminal 108 of the merchant 110 that the payment transaction 112 is authorized. The acquirer processor 120 can then electronically credit and settle the funds into the respective accounts as is known or would be understood in the art. See, for example, U.S. patent application Ser. No. 13/653,443 filed on Oct. 17, 2012 titled Systems, Methods and Apparatus for Variable Settlement Accounts.

The financial computing system 114 of the acquirer processor 120 can execute multiple applications, for example a telemetry application 116a and payment processing applications 116b, and 116c, collectively applications 116. The financial computing system 114 can be any suitable computing device 300 (FIG. 3), including multiple computing devices, virtual computing devices, networked computing devices, and so forth as would be known or understood in the art. The applications 116 can execute on one or multiple computing devices 300. Example payment processing applications 116b, 116c can include a process for receiving payment transactions 112 from merchants 110 and for sending payment authorizations to merchants 110, a process for communicating with payment associated computing devices 128 at financial institutions 130, for example to send BAU requests and received BAU responses, a settlement engine for settling received funds into settlement accounts based on rules or other configurations, a process for settling funds with financial institutions 130, and so forth. For any particular payment process, various processes can execute concurrently while other processes execute serially.

When the financial computing system 114 of the acquirer processor 120 receives a payment transaction 112, the financial computing system 114 can associate a unique transaction identifier with the payment transaction 112. The unique transaction identifier can be used to identify operations, transactions, processes, logs, and metrics associated with the processing of a payment transaction 112. The unique transaction identifier can be used in storing, sorting, querying, and identifying logs and metrics. The unique transaction identifier can be any suitable number or data structure for identifying telemetry data 134, 136, 138 and other information associated with the payment transaction 112. The financial computing system 114 can receive telemetry data 138 from each of a plurality of payment processing applications as the payment transaction 112 is processed. For example, the telemetry application 116a can receive a log message 134 from the point-of-sale terminal 108 regarding the payment transaction 112 or a message 136 from the payment associated computing device 128 of the financial institution 130, for example regarding the BAU request or BAU response.

The data that is received by the telemetry application 116a can be in any suitable format, and can be for example text, data in a data structure format, ASN.1 formatted data, or any other suitable format. In a configuration, the data that is received by the telemetry application 116a can be in a data contract format, for example a message suitable for use with the Microsoft .Net Framework. The telemetry application 116a can receive telemetry data 138 from the payment processing applications 116b, 116c as the payment transaction 112 is received, processed, routed, and authorized. The telemetry application 116a can receive telemetry data 138 as the various computing devices 300 of the payment network 100 perform their respective functions and operations. The telemetry data can include performance data, metadata, log messages, metrics, and other suitable data generated by applications 116b, 116c. The telemetry data 138 can be received asynchronously. The unique transaction identifier can be used to identify the payment transaction 112 that is associated with the telemetry data 138.

In a configuration, the telemetry application 116a can receive one or more timestamps in the telemetry data 138 sent by the payment processing applications 116b, 116c. In another configuration, the telemetry application 116a can determine the timestamps and duration of each of the payment processing applications 116b, 116c by reviewing system information on the financial computing system 114. For example the telemetry application 116a can receive or retrieve computing data such as CPU utilization and performance information based on processes or threads and compute a timestamp, duration, or other suitable time-based data. The telemetry application 116a can receive network telemetry data, for example by obtaining time stamps for data transmitted over the network 102 or by extracting information from packets received or transmitted by network interfaces 109, 118, or 132. Any suitable log message or time-based data can be gathered by the financial computing system 114 or telemetry application 116a and associated with one or more payment transactions 112.

Telemetry data 134, 136, 138 associated with a payment transaction 112 can be aggregated and stored 126 in a data store 122, for example a telemetry database. The telemetry data 134, 136, 138 can be queried, retrieved, processed, and the results presented 140 on a user interface 142. In a configuration, the telemetry data 134, 136, 138 can be stored, accessed, and searched based on the unique identifier associated with the processing for a particular payment transaction 112.

In various configurations the user interface 142 can include a physical computing device and instructions for presenting the telemetry data 134, 136, 138 on the physical computing device. The user interface 142 can include an application executing on a computer device, such as a laptop or desktop, an app executing on a mobile device, instructions for displaying telemetry data and receiving commands, for example a webpage, or any other suitable interactive or non-interactive means for the presentation of data. In a configuration, the user interface 142 can accept commands from a user for selecting and processing the telemetry data, for example to aggregate telemetry data into a format suitable for presentation. The user interface 142 can be a webpage, a dedicated application, or any other suitable means for presenting the telemetry data, aggregated telemetry data, or processed telemetry data. The user interface 142 can include a dashboard-like interface, and include different views for different kinds of data and metrics. For example, telemetry data 134, 136, 138 associated with a payment transaction 112 can be sorted and displayed in a chronological format based at least in part on a timestamp associated with each of the data. Sorting the data into a chronological format can allow a user on the user interface 142 to step through, or trace, a payment transaction 112 or other event either in real time as the transaction is processed or post processing. This trace feature can enable the user to determine where to make improvement to improve overall system performance. The data can be sorted into columns, for example a description column that describes the associated process, a type column that describes whether a process or operation is started or completed, a result column that describes the result or returned value from a process or operation, a timestamp column, a duration column, any number of flag type columns for describing or flagging important operations, errors, and or tracking counts of operations, and one or more identification columns for identifying the telemetry data 134, 136, 138, payment transaction 112, and/or the unique transaction identifier.

Although the financial computing system 114 is illustrated as executing on a computing device 300 associated with the acquirer processor 120, the financial computing system 114 can be an independent computing device 300, a computing device 300 associated with a third party, a computing device 300 associated with the financial institution 130, or any other suitable party. Similarly, the telemetry application 116a can be associated with any suitable party or any suitable computing device 300 in the payment processing network 100.

Figure 2:
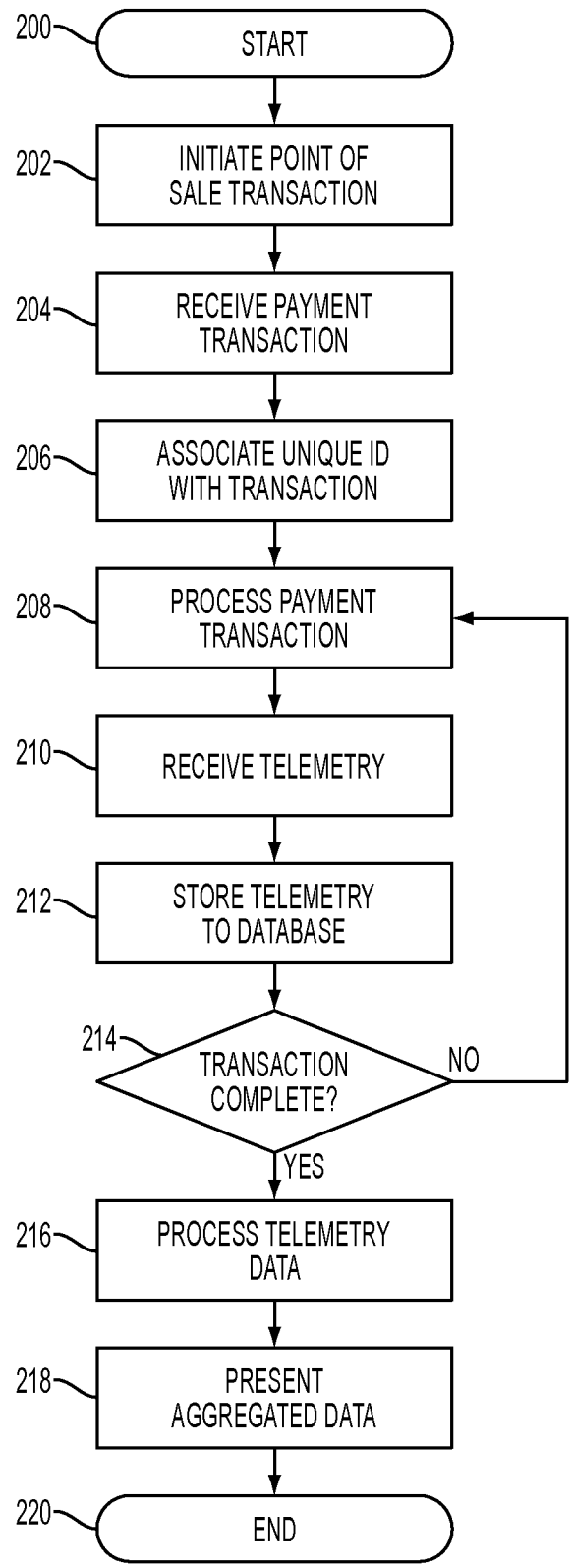
FIG. 2 depicts an example flow diagram of the system of FIG. 1.

FIG. 2 depicts an example flow diagram of the example system 100 of FIG. 1. Processing begins at start block 200 labeled START, where application processes in a payment processing network begin executing. Processing continues to process block 202.

In process block 202, a point-of-sale terminal 108 of a merchant 110 initiates a payment transaction 112 by transmitting the payment transaction 112 across the network 102 to an acquirer processor 120. Processing continues to process block 204.

In process block 204, the financial computing system 114 receives the payment transaction 112 from the point-of-sale terminal 108 of the merchant 110. Processing continues to process block 206.

In process block 206, the financial computing system 114 creates and associates unique identification data (a unique ID) with the payment transaction 112. Processing continues to process block 208.

In process block 208, a plurality of payment processing applications 116b, 116c process the payment transaction 112. For example, the payment processing applications 116b, 116c can send a BAU request for authorization 124 of funds from the financial institution 130 that issued the payment vehicle 104 associated with the payment transaction 112, receive a BAU response, authorize or decline the payment transaction 112, credit accounts, settle funds, and so forth. Each of these operations or steps can involve communications between payment processing applications 116b, 116c and between computing devices 300 in the payment network 100. Processing continues to process block 210.

In process block 210, the financial computing system 114 can receive telemetry data from the payment processing applications 116b, 116c and computing devices 300 in the payment network 100, including but not limited to telemetry data from the point-of-sale terminal 108, the financial institution 130, and the payment processing applications 116b, 116c. The telemetry data can be received on a common interface accessible to each of the payment processing applications 116b, 116c and computing devices 300 or through multiple interfaces. The financial computing system 114 can receive timing data associated with electronic communications received on network interfaces 109, 118, 132 or transmitted across the network. In a configuration, the payment processing applications 116b, 116c can communicate using network protocols, for example using TCP/IP or UDP type packets. The financial computing system 114 can inspect packets to obtain timing data. In a configuration, a telemetry application 116a associated with the financial computing system 114 receives the telemetry data. Processing continues to process block 212.

In process block 212, the telemetry data is stored 126 to a data store 122, for example a telemetry database. The telemetry data can be aggregated according to the unique identifier associated with the payment transaction 112. Processing continues to decision block 214.

In decision block 214, if processing of the payment transaction 112 has been completed then operation continues to process block 216, otherwise operation returns to process block 208 to continue processing the payment transaction 112.

In process block 216, the aggregated telemetry data can be further processed and analyzed. For example, aggregating the telemetry data can include sorting the telemetry data based on timestamps. Processing continues to process block 218.

In process block 218, the aggregated telemetry data can be presented to a user interface. The aggregated telemetry data can be presented in a configurable format according to the needs of the user. The user interface can use hypertext markup language (HTML), JAVA scripts, applets, dedicated applications, or any other suitable interfacing means as would be known or understood in the art. Processing terminates at end block 226 labeled END. Additional payment transaction 112 can be processed in accordance to blocks 202-218.

Figure 3:
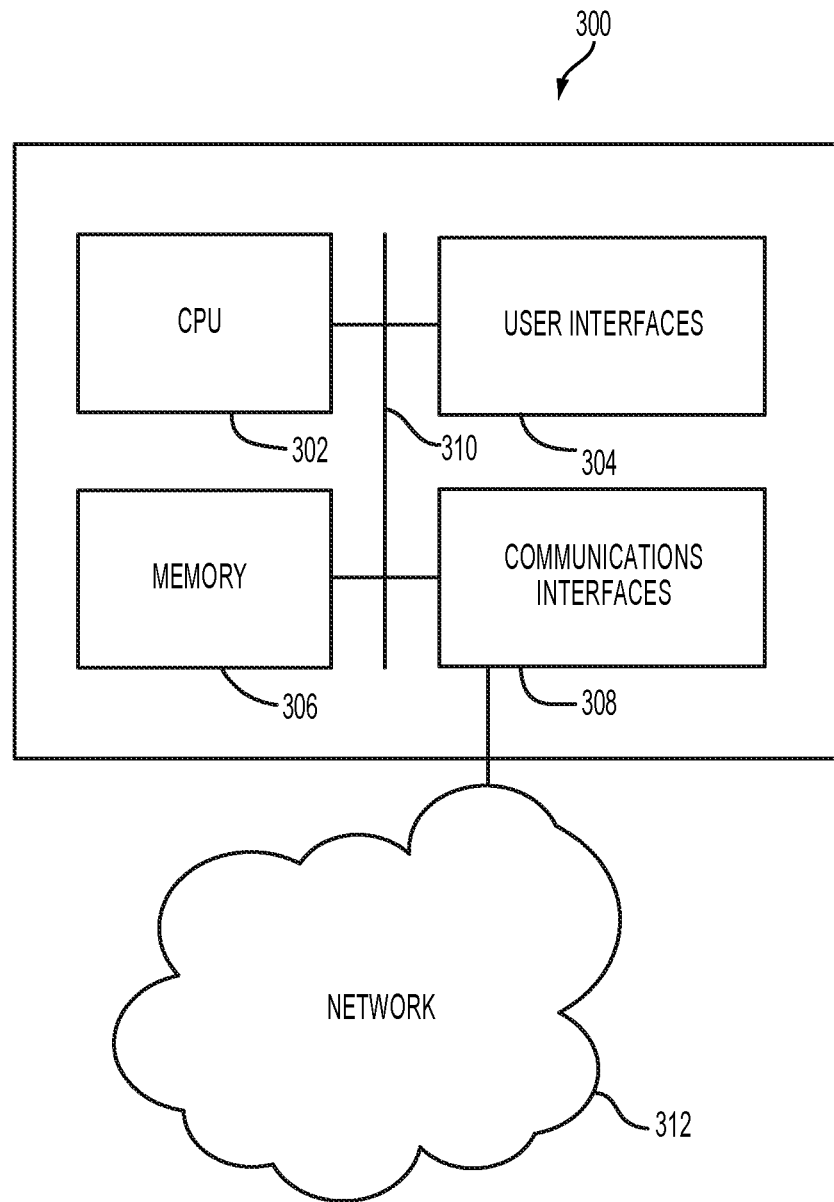
FIG. 3 depicts an example computing device of the system of FIG. 1.

The processes described above can be performed on or between one or more computing devices 300. Referring now to FIG. 3, an example computing device 300 is presented. A computing device 300 can be a server, a computing device that is integrated with other systems or subsystems, a mobile computing device, a cloud-based computing capability, and so forth. The computing device 300 can be any suitable computing device as would be understood in the art, including without limitation, a custom chip, an embedded processing device, a tablet computing device, a point of sale terminal associated with a merchant 110, a back office system of a merchant 110, a financial computing system 114, a payment associated computing device 128, a personal data assistant (PDA), a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

The computing device 300 includes a processor 302 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 300 also includes one or more memories 306, for example read only memory (ROM), random access memory (RAM), cache memory associated with the processor 302, or other memories such as dynamic RAM (DRAM), static ram (SRAM), programmable ROM (PROM), electrically erasable PROM (EEPROM), flash memory, a removable memory card or disk, a solid state drive, and so forth. The computing device 300 also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 302, or memories 306 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 308 can be configured to transmit to, or receive data from, other computing devices 300 across a network 312, such as network 102. The network and communication interfaces 308 can be an Ethernet interface, a radio interface, a Universal Serial Bus (USB) interface, or any other suitable communications interface and can include receivers, transmitter, and transceivers, such as network interfaces 109, 118, and 132. For purposes of clarity, a transceiver can be referred to as a receiver or a transmitter when referring to only the input or only the output functionality of the transceiver. Example communication interfaces 308 can include wired data transmission links such as Ethernet and TCP/IP. The communication interfaces 308 can include wireless protocols for interfacing with private or public networks 312. For example, the network and communication interfaces 308 and protocols can include interfaces for communicating with private wireless networks 312 such as a WiFi network, one of the IEEE 802.11x family of networks, or another suitable wireless network. The network and communication interfaces 308 can include interfaces and protocols for communicating with public wireless networks 312, using for example wireless protocols used by cellular network providers, including Code Division Multiple Access (CDMA) and Global System for Mobile Communications (GSM). A computing device 300 can use network and communication interfaces 308 to communicate with hardware modules such as a database or data store, or one or more servers or other networked computing resources. Data can be encrypted or protected from unauthorized access.

In various configurations, the computing device 300 can include a system bus 310 for interconnecting the various components of the computing device 300, or the computing device 300 can be integrated into one or more chips such as programmable logic device or application specific integrated circuit (ASIC). The system bus 310 can include a memory controller, a local bus, or a peripheral bus for supporting input and output devices 304, and communication interfaces 308. Example input and output devices 304 include keyboards, keypads, gesture or graphical input devices, motion input devices, touchscreen interfaces, one or more displays, audio units, voice recognition units, vibratory devices, computer mice, and any other suitable user interface.

The processor 302 and memory 306 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

These and other embodiments of the systems and methods can be used as would be recognized by those skilled in the art. The above descriptions of various systems and methods are intended to illustrate specific examples and describe certain ways of making and using the systems disclosed and described here. These descriptions are neither intended to nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

What is claimed is:

1. At a computing system including a telemetry application and a plurality of electronic transaction processing applications, a computer-implemented method of tracking an electronic transaction based on telemetry data, comprising:

receiving, by the computing system over a network, the electronic transaction including a payment transaction originating from a first electronic transaction processing application, among the plurality of electronic transaction processing applications, associated with a point of sale terminal where a user presents a payment vehicle to a merchant for payment of goods or services;

associating, by the computing system, a unique transaction identifier to the electronic transaction to identify one or more of operations or metrics associated with processing of the payment transaction;

retrieving, by the telemetry application of the computing system, first telemetry data associated with the electronic transaction corresponding to at least one of performance data, metadata, log messages, or metrics generated by each of the plurality of electronic transaction processing applications;

determining, by the telemetry application of the computing system, at least one of a first time and a first duration associated with the first telemetry data;

receiving, by the telemetry application of the computing system over the network, second telemetry data associated with the electronic transaction from the first electronic transaction processing application associated with the point of sale terminal;

receiving, by the telemetry application of the computing system over the network, third telemetry data associated with the electronic transaction from a second electronic transaction processing application, among the plurality of electronic transaction processing applications, associated with a remote electronic transaction processing device;

determining, by the telemetry application of the computing system, at least one of a second time and a second duration associated with the second telemetry data and at least one of a third time and a third duration associated with the third telemetry data;

aggregating, by the telemetry application of the computing system, the first telemetry data, the second telemetry data, and the third telemetry data by linking the first telemetry data, the second telemetry data, and the third telemetry data with the unique transaction identifier;

sorting, by the telemetry application of the computing system, the first telemetry data, the second telemetry data, and the third telemetry data into a chronological format;

presenting, by the computing system, the first telemetry data, the second telemetry data, and the third telemetry data associated with the electronic transaction on a user interface in the chronological format to enable a user to trace the electronic transaction while processing the electronic transaction in real-time or after the electronic transaction has been processed, wherein the network comprises a plurality of electronic transaction associated computing devices including the remote electronic transaction processing device, and the method further comprises receiving, by the computing system over the network, fourth telemetry data from at least one of the plurality of electronic transaction associated computing devices, wherein the plurality of electronic transaction associated computing devices includes the point of sale terminal, and wherein presenting the first telemetry data, the second telemetry data, and the third telemetry data associated with the electronic transaction on the user interface includes presenting network timing data associated with communications across respective network interfaces associated with processing the electronic transaction.

2. The computer-implemented method of claim 1, wherein the first telemetry data, the second telemetry data, or the third telemetry data comprises at least one of the log messages and time-based data.

3. The computer-implemented method of claim 1, wherein the first telemetry data, the second telemetry data, or the third telemetry data comprises at least one of application telemetry data and network telemetry data.

4. The computer-implemented method of claim 1, further comprising:
inspecting, by the telemetry application of the electronic transaction processing system, respective packets associated with the second telemetry data and the third telemetry data.

5. The computer-implemented method of claim 1, wherein the first telemetry data, the second telemetry data, or the third telemetry data is presented in a description column that describes the associated process, a type column that describes whether a process or operation is started or completed, a result column that describes the result or returned value from a process or operation, a timestamp column, a duration column, any number of flag type columns for describing or flagging important operations, errors, and or tracking counts of operations, and one or more identification columns for identifying the unique transaction identifier, the plurality of electronic transaction processing applications, the point of sale terminal, and the remote electronic transaction processing device.

6. The computer-implemented method of claim 1, wherein the computing system is a merchant acquirer computing system.

7. A non-transitory computer readable medium having instructions stored thereon that when executed by a processor of a computing system cause the processor to perform operations:

receiving, by the computing system over a network, an electronic transaction including a payment transaction originating from a first electronic transaction processing application, among a plurality of electronic transaction processing applications, associated with a point of sale terminal where a user presents a payment vehicle to a merchant for payment of goods or services;

associating, by the computing system, a unique transaction identifier to the electronic transaction to identify one or more of operations or metrics associated with processing of the payment transaction;

retrieving first telemetry data associated with the electronic transaction corresponding to at least one of performance data, metadata, log messages, or metrics generated by each of the plurality of electronic transaction processing applications;

determining, by a telemetry application of the computing system, at least one of a first time and a first duration associated with the first telemetry data;

receiving, by the telemetry application of the computing system over the network, second telemetry data associated with the electronic transaction from the first electronic transaction processing application associated with the point of sale terminal;

receiving, by the telemetry application of the computing system over the network, third telemetry data associated with the electronic transaction from a second electronic transaction processing application, among the plurality of electronic transaction processing applications, associated with a remote electronic transaction processing device;

determining, by the telemetry application of the computing system, at least one of a second time and a second duration associated with the second telemetry data and at least one of a third time and a third duration associated with the third telemetry data;

aggregating, by the telemetry application of the computing system, the first telemetry data, the second telemetry data, and the third telemetry data by linking the first telemetry data, the second telemetry data, and the third telemetry data with the unique transaction identifier;

sorting, by the telemetry application of the computing system, the first telemetry data, the second telemetry data, and the third telemetry data into a chronological format;

presenting, by the computing system, the first telemetry data, the second telemetry data, and the third telemetry data associated with the electronic transaction on a user interface in the chronological format to enable a user to trace the electronic transaction while processing the electronic transaction in real-time or after the electronic transaction has been processed, wherein the network comprises a plurality of electronic transaction associated computing devices including the remote electronic transaction processing device, and the instructions further cause the processor to receive fourth telemetry data from at least one of the plurality of electronic transaction associated computing devices, wherein the plurality of electronic transaction associated computing devices includes the point of sale terminal, and wherein presenting the first telemetry data, the second telemetry data, and the third telemetry data associated with the electronic transaction on the user interface includes presenting network timing data associated with communications across respective network interfaces associated with processing the electronic transaction.

8. The non-transitory computer readable medium of claim 7, wherein the first telemetry data, the second telemetry data, or the third telemetry data comprises at least one of the log messages and time-based data.

9. The non-transitory computer readable medium of claim 7, wherein the first telemetry data, the second telemetry data, or the third telemetry data comprises at least one of application telemetry data and network telemetry data.

10. The non-transitory computer readable medium of claim 7, wherein the operations further comprise:
inspecting, by the telemetry application of the electronic transaction processing system, respective packets associated with the second telemetry data and the third telemetry data.

11. The non-transitory computer readable medium of claim 7, wherein the first telemetry data, the second telemetry data, or the third telemetry data is presented in a description column that describes the associated process, a type column that describes whether a process or operation is started or completed, a result column that describes the result or returned value from a process or operation, a timestamp column, a duration column, any number of flag type columns for describing or flagging important operations, errors, and or tracking counts of operations, and one or more identification columns for identifying the unique transaction identifier, the plurality of electronic transaction processing applications, the point of sale terminal, and the remote electronic transaction processing device.

12. The non-transitory computer readable medium of claim 7, wherein the processor is implemented on a merchant acquirer computing system.

13. An electronic transaction processing system, comprising at least one computer processor, the at least one computer processor configured to execute instructions for:
receiving, by a computing system over a network, an electronic transaction including a payment transaction originating from a first electronic transaction processing application, among a plurality of electronic transaction processing applications, associated with a point of sale terminal where a user presents a payment vehicle to a merchant for payment of goods or services;
associating, by the computing system, a unique transaction identifier to the electronic transaction to identify one or more of operations or metrics associated with processing of the payment transaction;
retrieving, by a telemetry application of the electronic transaction processing system, first telemetry data associated with the electronic transaction corresponding to at least one of performance data, metadata, log messages, or metrics generated by each of the plurality of electronic transaction processing applications;
determining, by the telemetry application of the computing system, at least one of a first time and a first duration associated with the first telemetry data;
receiving, by the telemetry application of the computing system over the network, second telemetry data associated with the electronic transaction from the first electronic transaction processing application associated with the point of sale terminal;
receiving, by the telemetry application of the computing system over the network, third telemetry data associated with the electronic transaction from a second electronic transaction processing application, among the plurality of electronic transaction processing applications, associated with a remote electronic transaction processing device;
determining, by the telemetry application of the computing system, at least one of a second time and a second duration associated with the second telemetry data and at least one of a third time and a third duration associated with the third telemetry data;
aggregating, by the telemetry application of the computing system, the first telemetry data, the second telemetry data, and the third telemetry data by linking the first telemetry data, the second telemetry data, and the third telemetry data with the unique transaction identifier;
sorting, by the telemetry application of the computing system, the first telemetry data, the second telemetry data, and the third telemetry data into a chronological format;
presenting, by the computing system, the first telemetry data, the second telemetry data, and the third telemetry data associated with the electronic transaction on a user interface in the chronological format to enable a user to trace the electronic transaction while processing the electronic transaction in real-time or after the electronic transaction has been processed,
wherein the network comprises a plurality of electronic transaction associated computing devices including the remote electronic transaction processing device, and the at least one computer processor is further configured for receiving fourth telemetry data from at least one of the plurality of electronic transaction associated computing devices,
wherein the plurality of electronic transaction associated computing devices includes the point of sale terminal, and
wherein presenting the first telemetry data, the second telemetry data, and the third telemetry data associated with the electronic transaction on the user interface includes presenting network timing data associated with communications across respective network interfaces associated with processing the electronic transaction.

14. The electronic transaction processing system of claim 13, wherein the first telemetry data, the second telemetry data, or the third telemetry data comprises at least one of the log messages and time-based data.

15. The electronic transaction processing system of claim 13, wherein the network comprises a plurality of electronic transaction associated computing devices including the remote electronic transaction processing device.

16. The electronic transaction processing system of claim 13, wherein the electronic transaction processing system is a merchant acquirer computing system.

17. The electronic transaction processing system of claim 13, wherein the first telemetry data, the second telemetry data, or the third telemetry data is presented in a description column that describes the associated process, a type column that describes whether a process or operation is started or completed, a result column that describes the result or returned value from a process or operation, a timestamp column, a duration column, any number of flag type columns for describing or flagging important operations, errors, and or tracking counts of operations, and one or more identification columns for identifying the unique transaction identifier, the plurality of electronic transaction processing applications, the point of sale terminal, and the remote electronic transaction processing device.

* * * * *